United States Patent
Goings

[15] 3,674,191
[45] July 4, 1972

[54] REFUSE AND TISSUE HOLDER

[72] Inventor: Harford E. Goings, 5428 Center Drive, Camp Springs, Md. 20031

[22] Filed: Sept. 4, 1970

[21] Appl. No.: 69,784

[52] U.S. Cl. .................................... 224/29 R, 206/19.5
[51] Int. Cl. .................................................. B60r 7/06
[58] Field of Search .................... 248/302, 303, DIG. 5; 206/19.5 R, 19.5 B; 220/23.4, 23.3; 224/29

[56] References Cited

UNITED STATES PATENTS

| | | | |
|---|---|---|---|
| 1,717,320 | 6/1929 | Victor | 206/19.5 B X |
| 1,982,855 | 12/1934 | Brunner et al | 206/19.5 B X |
| 2,678,184 | 5/1954 | Erdody | 248/DIG. 5 |
| 2,887,216 | 5/1959 | Hargraves | 206/19.5 R |
| 3,004,655 | 10/1961 | Whitnack | 206/19.5 R |
| 3,008,569 | 11/1961 | Murch | 206/19.5 R |

*Primary Examiner*—Philip Arnold
*Attorney*—Alexander B. Blair

[57] ABSTRACT

A spring clip securing a refuse holder to the front of a vehicle glove compartment and a tissue holder secured and detachably mounted in the alternative to the front of the refuse holder.

1 Claim, 4 Drawing Figures

PATENTED JUL 4 1972 3,674,191

INVENTOR.
HARFORD E. GOINGS
BY
Alexander B. Blair
ATTORNEY.

REFUSE AND TISSUE HOLDER

This invention relates to a refuse and tissue holder for use in a vehicle.

Accordingly, a primary object of this invention is to provide a refuse and tissue holder within easy reach of the passengers.

Another object of this invention is to provide means for attaching the refuse and tissue holder to the interior of the vehicle and allowing its position to be adjusted.

The above and other objects of this invention will become apparent to those skilled in the art after a consideration of the following detailed description of the preferred embodiments of this invention taken together with the accompanying drawing wherein.

Figure 1:
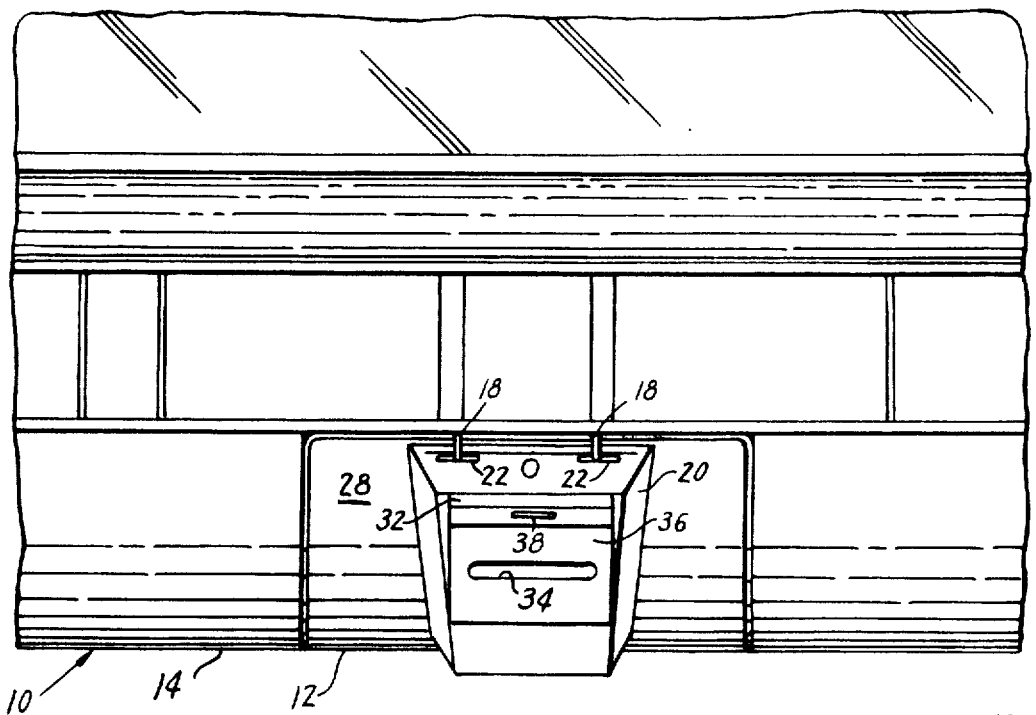
FIG. 1 is a front view of the holder.
Figure 2:
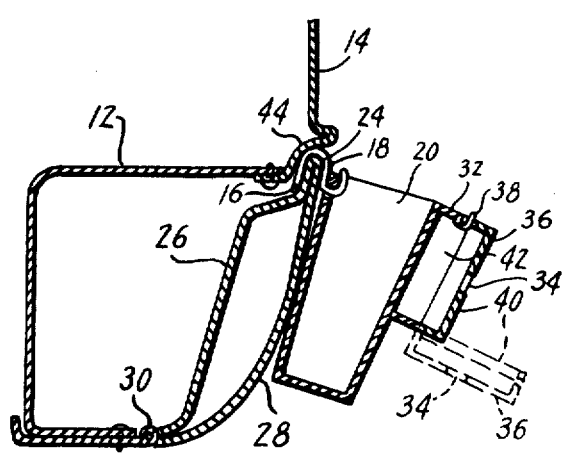
FIG. 2 is a side cross-sectional view thereof.
Figure 3:
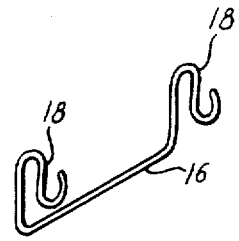
FIG. 3 is a spring clip for securing the holder to the glove compartment door.

Referring in detail to the drawing, there is shown the interior 10 of a vehicle having a glove compartment 12 in a dashboard 14. A clip spring 16, as clearly shown in FIG. 3, has an S-shaped hook 18 at each end thereof transverse with the longitudinal body thereof, each S-shaped hook 18 lying in a plane parallel to each other. A refuse holder 20 has a pair of slots 22 in the rear wall thereof being the same distance away from each other as said S-shaped hooks 18. The longitudinal body of spring clip 16 and the loop of S-hook extending from the longitudinal body are draped over the end 24 of the glove compartment door 26. The outer loop of S-shaped hooks 18 is inserted through slots 22 which are in close proximity to the top of the refuse holder so that the hook partially loops over the top edge of the refuse holder to firmly secure it to the front surface 28 of glove compartment door 26. Spring clip 16 will secure holder 20 in place when glove compartment door 26 is either in its closed position as shown in FIG. 2 or when it is pivoted downward to its open position by means of hinge 30. Extending from or secured to holder 20 is a tissue holder 32 having a slot 34 at the outer side 36 thereof for pulling a tissue out and having a snap or lock 38 at the top end thereof for pivotally separating the two sections 40 and 42 when tissue holder 32 is to be refilled.

Figure 4:
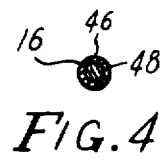
FIG. 4 is a cross-sectional view of the spring clip.

It should be noted that refuse holder 20 and tissue holder 32 may be moved to any position along the length of glove compartment 12 by sliding S-shaped hooks 18 between the top end 24 of door 28 and the concave wall portion 44. Also, spring clip 16 has a plastic covering 46 over the metal wire 48 as shown in FIG. 4.

While the preferred embodiments of this invention have been illustrated and described, it will be understood by those skilled in the art that many changes and modifications may be resorted to without departing from the spirit and scope of this invention.

I claim:

1. A detachable holder for the interior of a vehicle, comprising a refuse container, clip means securing said refuse container to the front of a hinged door located on the dashboard of the vehicle, a tissue container integrally formed with the front of said refuse container, said clip means allowing said refuse and tissue containers to be slidably positioned along the length of said hinged door as desired by the passenger for easy access, allowing said refuse and tissue containers to be quickly and simply detached for storage somewhere else when not in use if desired, and allowing said refuse and tissue containers to be secured to the hinged door in its pivotally opened state as well as when it is in its closed position, said clip means including a longitudinal body having an S-shaped hook extending from each end thereof, the rear wall of said refuse container having a pair of slots adjacent to and parallel the upper edge thereof through which the outside loop of said S-shaped hook is inserted, the inside loop of said S-shaped hooks being draped and clipped over the top end of the hinged door with said longitudinal body being on the inside surface of the hinged door, and a slotted dispensing cover for said tissue container hingedly secured to said tissue container.

* * * * *